United States Patent [19]
Grant

[11] 3,930,603
[45] Jan. 6, 1976

[54] LOW INERTIA CAPSTAN

[75] Inventor: Frederic F. Grant, Bellflower, Calif.

[73] Assignee: Ampex Corporation, Redwood City, Calif.

[22] Filed: Nov. 2, 1973

[21] Appl. No.: 412,280

[52] U.S. Cl. ............... 226/190; 226/95; 29/132
[51] Int. Cl.² ................................ B65H 17/20
[58] Field of Search ....... 226/97, 95, 190, 191, 181, 226/186, 187; 29/132; 301/63 PW, 104, 54, 55

[56] References Cited
UNITED STATES PATENTS

| | | | |
|---|---|---|---|
| 2,000,573 | 5/1935 | Spatta | 301/104 |
| 3,042,281 | 7/1962 | Balvin | 226/191 X |
| 3,537,661 | 11/1970 | Isom | 226/191 X |
| 3,554,420 | 1/1971 | Agius | 226/190 |
| 3,622,059 | 11/1971 | Savela | 226/190 |
| 3,645,432 | 2/1972 | French | 226/190 |
| 3,659,797 | 5/1972 | Coy | 226/186 X |
| 3,695,728 | 10/1972 | Haussels | 301/63 PW X |
| 3,695,729 | 10/1972 | Schwerdhoter | 301/63 PW |

*Primary Examiner*—Richard A. Schacher

[57] ABSTRACT

A resiliently deformable low inertia capstan for driving magnetic tape in a digital tape transport is comprised substantially of plastic material having a low elastic modulus and provides substantial rigidity in a circumferential direction as well as accepting substantial deformation in other directions without damage. The capstan includes a rigid inner hub defining a concentric cylinder, a thin-walled cylindrical outer rim disposed concentrically about the inner hub, and a pair of thin-walled, somewhat conical side members interconnecting the hub and rim at opposite ends thereof. Circumferential grooves in the outer surface of the rim improve capstan aerodynamics and a thin coating of polyurethane on the lands of the rim improves the coefficient of friction. Holes through the outer rim reduce the inertia of the capstan, may be selectively spaced to indicate a desired rotational velocity when strobed at a selected frequency by a light source, and may be used in conjunction with negative or positive fixed pressure to respectively increase or decrease frictional engagement between a driven tape and the rim.

22 Claims, 10 Drawing Figures

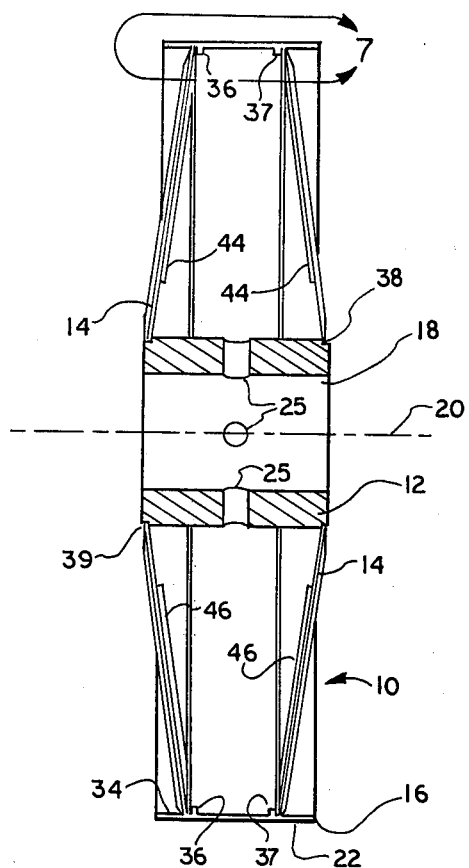
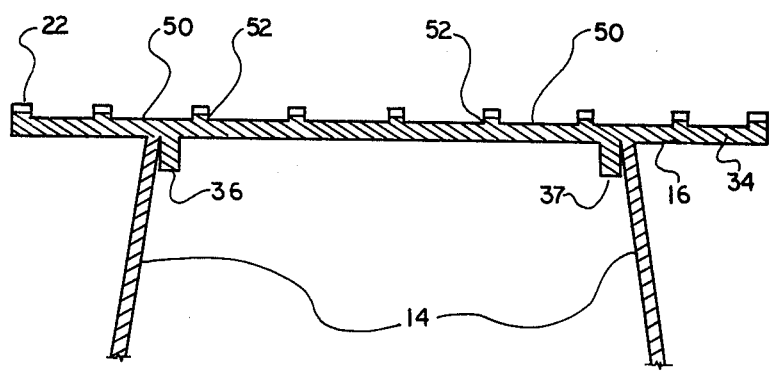

LOW INERTIA CAPSTAN

BACKGROUND OF THE INVENTION

1. Field of the Invention

The present invention relates to drive capstans for magnetic tape transports, and more particularly to a low inertia capstan for use in magnetic tape transports of the digital type designed for intermittent, bidirectional operation such as in a data processing environment.

2. History of the Prior Art

As data processing and similar operations have become faster and more sophisticated, increasingly greater demands have been placed on associated magnetic tape equipment. Such equipment may include one or more tape transports, each having one or more capstans which continuously or selectively engage magnetic tape and which must be capable of accelerating the tape from rest to nominal speed within an extremely short period of time, maintaining the nominal speed for as long as necessary, and then either decelerating the tape to rest or reversing the direction of drive of the tape, again in an extremely short time.

The relatively rapid acceleration and deceleration required in systems of the type described is accomplished in part by use of capstans of relatively light weight so as to minimize the resulting inertia of the capstan. At the same time the capstan must have sufficient strength and sturdiness to be capable of supporting the tape under considerable tension without distortion and to permit handling of the capstan without physical damage. Most capstans are made of a lightweight metal such as aluminum in order to provide the necessary strength. However since almost all metals including aluminum have a relatively high elastic modulus, a metal capstan may be required to have considerable mass to maintain the required structural integrity while shipping, assembling and otherwise handling the capstan. If the capstan is made too thin or is overloaded so as to exceed its elastic limit, the capstan will become bent or otherwise permanently distorted and thereby rendered useless. In an effort to achieve low inertia by minimizing the amount of material used for construction, the strength of a conventional capstan is often reduced to such an extent that the mere inadvertent dropping of such a capstan on a floor or other hard surface is often enough to damage the capstan beyond repair because of the close tolerances involved.

In an effort to make capstans relatively strong and rigid, metals of substantial thickness have been used. However this adversely affects the capstan in terms of mass, inertia and other factors. Increasing the thickness of the metal parts greatly increases the resulting mass and inertia of the capstan, particularly if the cylindrical outer rim is increased in thickness as is often required. Capstans of relatively large inertia are difficult to accelerate and decelerate within allowed times and further decrease system performance by increasing power consumption, increasing the amount of heat which must be dissipated, and requiring a larger capstan drive motor with its own increased inertia. Other disadvantages which arise out of the demand for capstans of substantial sturdiness include the concomitant decrease in the number or size of holes in the outer rim which are permitted in order to achieve pneumatic handling of the tape relative to the capstan.

These circumferential holes are frequently provided in the capstan outer rim to permit communication of a vacuum or other source of reduced pressure in the vicinity of the capstan to the tape and thereby enhance the engagement of the capstan with the tape. Such holes may also function to communicate a source of high pressure in the vicinity of the capstan to the region between the capstan outer surface and the tape, thereby producing an air bearing between the capstan and the tape during certain modes of operation. The strength and rigidity requirements of the capstan frequently dictate that such holes in the outer rim be small and far enough apart so as to prevent distortion of the capstan, particularly beyond its elastic limit. At the same time however the holes of relatively small size and spaced a considerable distance from one another greatly decrease the communication of both high and low pressure sources through the capstan outer rim.

Accordingly it would be advantageous to provide a capstan having a considerably lower inertia than the metal capstans now in use while at the same time having the necessary strength for driving the tape under conditions of considerable tension without resultant damage or destruction of the capstan. Such capstan should desirably have an outer rim, a substantial portion of the surface area of which may comprise apertures or grooves combined with apertures so as to enhance pneumatic holddown of the tape or the formation of an air bearing therewith without at the same time sacrificing the ability of the capstan to support the tape under substantial tension. Such capstan should also desirably be so constructed so as to withstand occasional shipping, assembly and other handling abuses such as inadvertent dropping thereof without damage or destruction and should be relatively easy to fabricate.

BRIEF DESCRIPTION OF THE INVENTION

Capstans in accordance with the invention are comprised principally of thin plastic so as to decrease their mass and inertia several orders of magnitude with respect to metal capstans of comparable size without increasing their susceptibility to damage. At the same time however such capstans are constructed so as to possess the necessary strength and rigidity in a circumferential direction in which accelerating torques are applied. The inherent elasticity and thinness of the plastic parts of the capstan enable the capstan to undergo substantial resilient deformation in other than circumferential and radial directions without exceeding its elastic limit while the design shape provides substantial resistance to significant deformation in the circumferential and radial directions as a result of tape forces. As a result, the plastic parts of the capstan can be made very thin, even further decreasing the mass and resulting inertia of the capstan. Where desired a substantial portion of the outer surface of the capstan rim can be comprised of grooves or apertures, due to the substantial elasticity of the capstan.

In one preferred embodiment of a capstan in accordance with the invention a pair of extremely thin resiliently deformable plastic webs of partially conical configuration are mounted on the opposite ends of a generally cylindrical inner hub which is substantially of plastic construction and which is rotatable about a central axis thereof. The webs are so arranged as to be separated from one another by a maximum distance at the inner hub and to draw closer together in directions toward their outer edges which support a very thin, hollow, generally cylindrical outer rim of plastic construction. The triangulation effect provided by this construction lends sufficient strength to the resulting capstan structure, in the axial direction for rigid opposition to relatively small axially directed forces encountered in normal operation even when the respective parts and particularly the webs are made of very thin plastic material. The mass and resulting inertia of the capstan may be even further minimized by cutting out and removing portions of the webs during manufacture thereof so as to define a plurality of spokes which comprise a substantial portion of the webs and which extend generally radially outward between the inner hub and the outer rim. The spokes are preferably made curved in cross section so as to increase the section moment of the spokes and thereby make them more resistant to bending. Greater resistance to buckling under radial forces is thus provided, thus affording the capstan greater radial structural integrity to produce a more constant relationship between tape speed and capstan angular velocity under conditions of changing tape tension.

Capstans in accordance with the invention are readily fabricated using conventional techniques for forming plastic parts. The inner cylindrical hub may be readily formed from a piece of plastic by a conventional machining process. The outer rim may be formed by turning on a lathe and then finish grinding or alternatively by vacuum deep drawing. The partially conical webs may be formed by any appropriate process such as stamping, but are preferably vacuum formed due to the relatively thin plastic material typically used. After being so formed the appropriate portions may be cut and removed so as to form the spokes. The various parts of the capstan may then be assembled using epoxy, polyester or other appropriate solvent cementing substances. Upon assembly the capstan is rotated while the outer surface thereof is ground to the required tolerances. The capstan is preferably heated to a predetermined temperature to relieve internal stresses prior to grinding so as to prevent undesirable deformation of the capstan during grinding and subsequent use thereof.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 4 is a sectional view taken along the line 4—4 of FIG. 3;

FIG. 7 is a sectional view of the outer rim and the adjoining portions of the webs of the capstan of FIG. 1 with the outer surfaces of the outer rim provided with a plurality of circumferential grooves in accordance with the invention;

DETAILED DESCRIPTION

Figure 1:
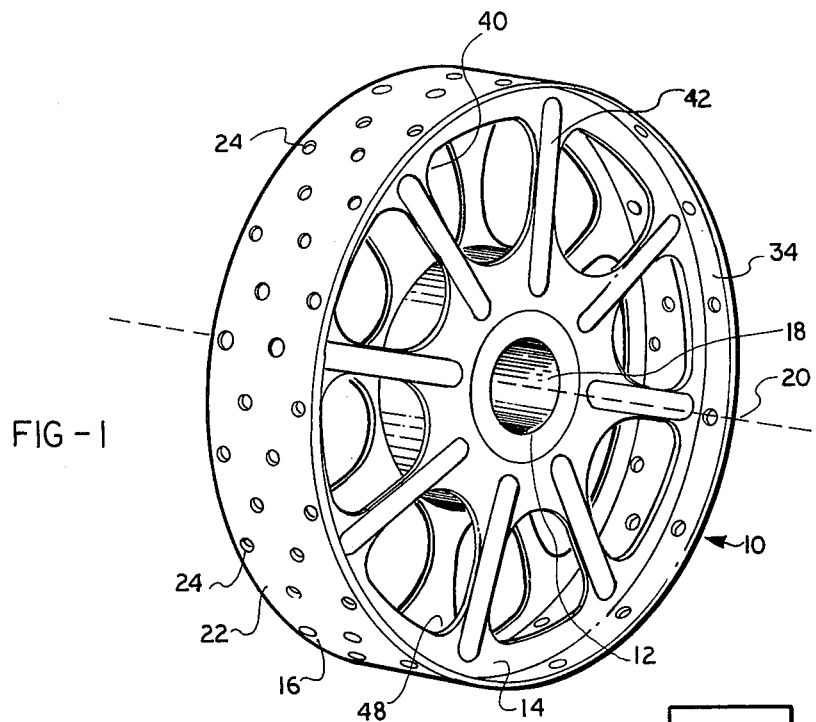
FIG. 1 is a perspective view of one preferred embodiment of a capstan in accordance with the invention.
Figure 2:
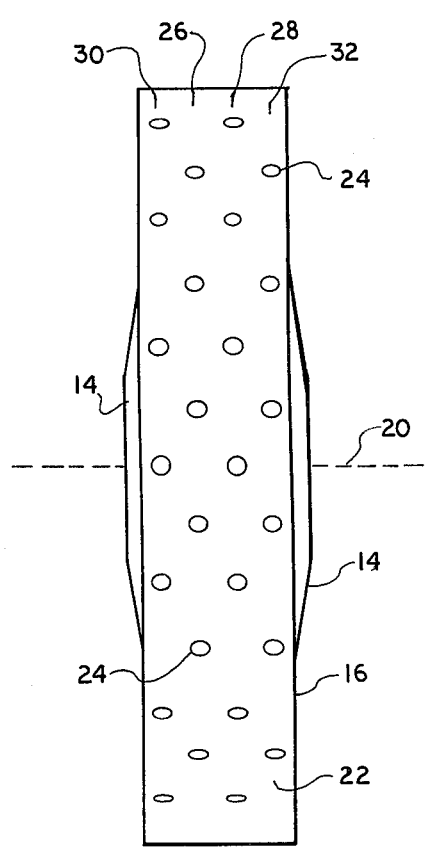
FIG. 2 is an end view of the capstan of FIG. 1.
Figure 3:
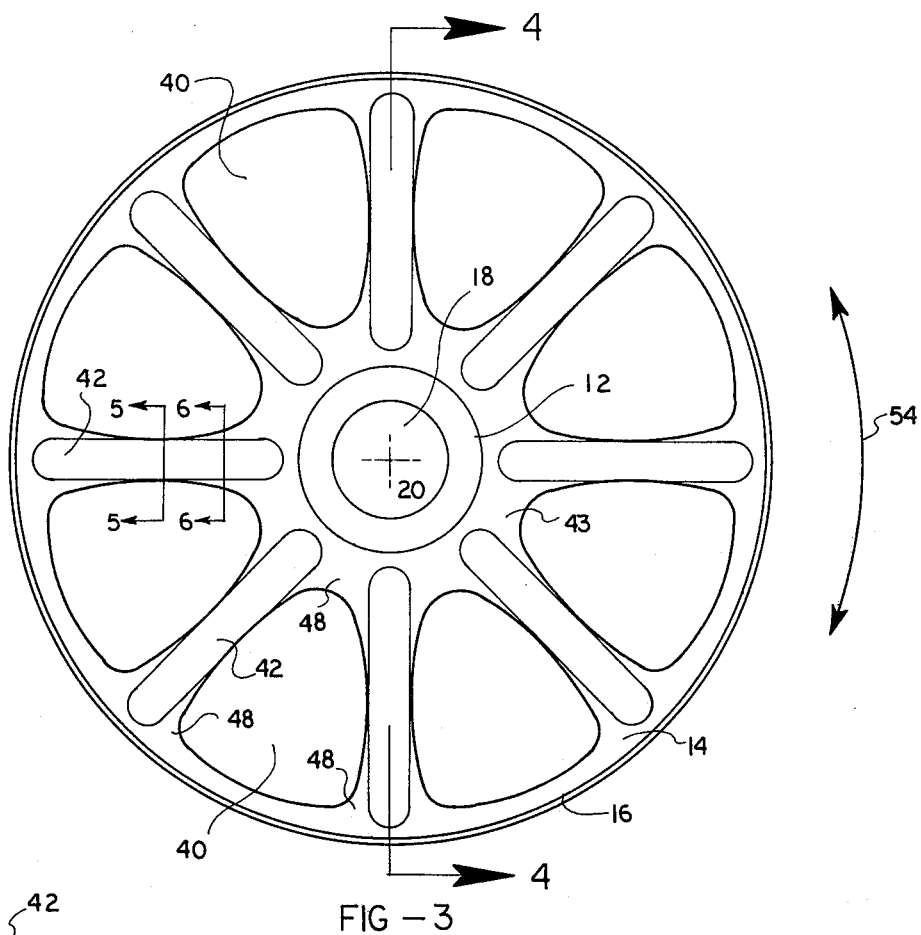
FIG. 3 is a side view of the capstan of FIG. 1.

The capstan 10 of FIG. 1 which is also illustrated in FIGS. 2, 3 and 4 includes an inner hub 12, a pair of webs 14 and an outer rim 16. The hub 12 which is of generally cylindrical configuration is filleted at its opposite ends so as to receive the webs 14, as best seen in FIG. 4. The hub 12 is provied with an aperture 18 which serves to mount the capstan such as by receiving the shaft of an associated motor (not shown) for rotation about a central axis 20 of the hub 12.

The outer rim 16 is of hollow, generally cylindrical configuration and is mounted on the outer edges of the webs 14 so as to be generally concentric with the inner hub 12. Accordingly rotation of the capstan 10 about the central axis 20 causes the rim 16 to rotate about its own central axis which coincides with the central axis 20. The rim 16 has an outer surface 22 which engages a magnetic tape. The outer surface 22 includes a plurality of apertures or holes 24 which extend through the thickness of the rim 16 to facilitate communication of low pressure or high pressure from inside the capstan to the outer surface 22 thereof. As illustrated in FIG. 4 a pair of diametric holes 25 may be optionally formed in the hub 12 along perpendicular intersecting axes approximately midway along axis 20. The holes 25 may be aligned with similar holes in a hollow capstan motor shaft (not shown) to permit communication between circumferential holes 24 and a source of positive or negative pressure connected to the motor shaft.

As best seen in FIG. 2 the various holes 24 are arranged into four circumferential rows 26, 28, 30 and 32. The inner rows 26 and 28 lie between the opposite webs 14. The outer rows 30 and 32 which are disposed outside of the respective opposite webs 14 may comprise appropriate numbers of the holes 24 so as to provide a desired stroboscopic effect in response to a predetermined frequency or frequencies for timing purposes. The holes 24 may also be used in conjunction with a source of negative or positive pressure to respectively increase or decrease frictional engagement between magnetic tape and surface 22.

As seen in FIG. 4 as well as in FIG. 2 each of the webs 14 is partially conical in shape in that it describes a conical section. The small circular opening at the top of the section so defined surrounds and engages an end of the inner hub 12. The outer periphery of the resulting section is mounted against the inner cylindrical surface 34 of the outer rim 16. As seen in FIG. 4, as well as in FIG. 7 which is described hereinafter, the inner surface 34 is provided with a pair of generally cylindrical, inwardly extending flanges 36 and 37 disposed between and adjacent respective ones of the opposite webs 14. The flanges 36 and 37 help to locate and maintain the outer edges of the webs 14 at the desired locations on the inner surface 34 of the outer rim 16 as they are cemented or bonded to the rim 16. The flanges 36 and 37 also serve to enhance the rigidity of the capstan 10 by preventing inward axial movement of the outer edges of the webs 14 along the inner surface 34 of the rim 16 in response to forces which are exerted on the outer surface 22 of the rim 16 by tape under tension. A pair of circumferential notches 38 and 39 positioned at the opposite ends of the hub 12 similarly help to locate and maintain the inner edges of the webs 14 as they are cemented or bonded to the hub 12.

The partially conical webs 14 are mounted between the hub 12 and the rim 16 such that distances between the webs 14 in the vicinity of the hub 12 are greater than distances between the webs 14 in the vicinity of the rim 16. The resulting triangulation effect greatly enhances the strength and rigidity of the capstan. In the event the webs 14 were cylindrical in shape, they would have a great tendency to give in response to lateral forces allowing the outer rim 16 to move back and forth along the central axis 20. Because of the partial conical shape of the webs 14 however, the webs 14 form other than right angles with the hub 12 and the rim 16. The resulting triangulation effect as best seen in FIG. 4 rigidifies the capstan 10 so as to greatly resist axial movement of the rim 16 relative to the hub 12 despite the extreme thinness of the webs 14.

Figure 5:
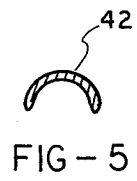
FIG. 5 is a sectional view of a portion of one of the spokes of the FIG. 3 arrangement taken along the line 5—5 thereof.
Figure 6:
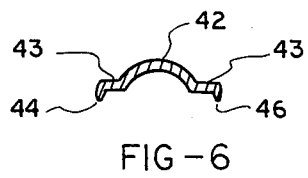
FIG. 6 is a sectional view of a different portion of the same spoke of the FIG. 3 arrangement taken along the line 6—6 thereof.

As best seen in FIGS. 1 and 3 the webs 14 have a plurality of openings 40 of generally uniform size substantially equidistantly spaced about the periphery thereof so as to define a plurality of spokes 42 which extend generally radially outward between the hub 12 and the rim 16. The spokes 42 are interconnected in the vicinity of the inner and outer circumferences of the webs 14 by web material 43 generally conforming to and defining the partially conical shape of the webs 14. The openings 40, which need not be formed when the capstan 10 is to be used in conjunction with a source of positive and negative pressure, greatly reduce the mass and resulting inertia of the capstan 10. The strength of the spokes 42 is increased by fabrication so as to be curved in cross section as shown in FIGS. 5 and 6. As seen in FIG. 5 the intermediate portion of each spoke 42 is generally C-shaped in cross section to provide substantial rigidity against radial forces which typically occur as a result of tension in tape which is wrapped about the capstan 10. The radially inward portion of each spoke 42 as shown in FIG. 6 takes on a somewhat different shape in cross section due to the presence of a pair of flanges 44 and 46 disposed along the opposite sides of the web material 43 adjacent each spoke 42 as a result of the forming and shearing steps of the manufacturing process. As best seen in FIG. 4 the flanges 44 and 46 extend generally perpendicularly away from the cone of the webs 14 by distances which increase as a factor of distance from the outer edge. The flanges 44 and 46 combine with the curved cross section of the spokes 42 to provide the spokes with substantial strength. Furthermore, any rough or uneven shearing edge at which points of increased stress might develop thus occurs along the flanges 44 and 46 rather than in the conical plane where large multiple stresses are encountered during rapid acceleration and deceleration of the capstan 10.

As will be seen in FIG. 1 and particularly FIG. 3 the openings 40 which define the various spokes 42 are curved at the various corners thereof so as to define fillets 48. The fillets 48 further reduce stress concentrations to prevent fatigue cracks from forming at the corners of the openings 40 during use of the capstan 10.

Despite the extreme thinness of the various parts of the capstan 10, particularly the webs 14, the material comprising the various parts of the capstan need not be particularly strong so long as it is generally tough, has a high impact strength and has good dimensional stability. The capstan 10 requires substantial rigidity in circumferential directions of rotation 54 about the central axis 20 as illustrated in FIG. 3 and moderate rigidity in axial directions in order to withstand the forces applied by tape tension, but requires very little axial rigidity. Above all, the material must be relatively elastic; otherwise the elastic limit of the material may be exceeded during operation resulting in damage or destruction of the capstan. Aluminum and steel have a tensile strain of approximately 0.003 or less at yield (the point where permanent tensile deformation equals 0.2%). Polycarbonate plastic which is a preferred material, has a substantially greater strain of approximately 0.03 at the yield point. It is also desirable that the material comprising the various parts of the capstan 10 be chemically resistant, particularly to alcohol and other substances which are commonly used in tape transports such as for cleaning purposes.

Plastics in general are suitable for use as the various parts of the capstan 10 including the hub 12, the webs 14 and the rim 16. It has been found that despite the relatively low strength of most plastics as compared with metals, for example, plastics can be used to advantage in capstans according to the invention, even when formed so as to be relatively thin. The designs of the various capstan parts and particularly the webs 14 provide a capstan with sufficient strength and rigidity to effectively resist all tape transport operating forces including magnetic tape tension, start, stop and reverse inertial forces, and high rotational velocity centrifugal forces.

Despite the suitability of plastics in general for many applications of capstans in accordance with the invention, certain types of plastics are preferred, particularly for high speed, high demand applications, because of their superior properties including toughness, impact strength and dimensional stability. One material which is preferred comprises thermoplastic polycarbonate resins marketed under the registered trademark "Lexan" by General Electric Company. Other suitable material include acetal copolymer, polyamide (nylon) and acrylonitrile-butadiene-styrene (ABS). Materials of this type have an impact strength on the order of 12–16 ft.-lbs/in of notch, and a tensile modulus of elasticity of about 3.0 to $5.0 \times 10^5$ pounds per square inch, making them well suited for use in the capstans of the invention. The tensile modulus of elasticity for materials in accordance with this invention contrasts with the much greater modulus of elasticity in tension of conventional materials such as die cast aluminum which is on the order of $10 \times 10^6$ pounds per square inch. Capstan materials in accordance with the invention have a tensile modulus of elasticity less than that of aluminum and preferably less than $3 \times 10^6$ pounds per square inch.

Capstans in accordance with the invention have been constructed and successfully tested at tape speeds of 250 inches per second and greater with excellent results. One type of capstan which is made of Lexan and which has a radius of 1.25 inches has been very successfully operated at speeds on this order and has been determined to have very desirable characteristics. Prior art metal capstans having a radius on this order typically have an inertia of about 0.9 millinch-ounce-seconds$^2$. In contrast, capstans according to the invention having this radius and having no holes 24 in the rim 16 thereof have an inertia on the order of 0.242 millinch-ounce-seconds$^2$. When the same capstan is provided with the holes 24 the inertia is reduced to 0.202 millinch-ounce-seconds$^2$. This is a decrease in the capstan inertia by a factor of approximately 4 over prior art capstans. With no holes 24 the capstan 10 thus has a ratio of inertia to diameter of approximately 0.194 millinch-ounce-seconds$^2$ per inch compared to a conventional capstan having a ratio of approximately 0.72 millinch-ounce-seconds$^2$ per inch. A capstan in accordance with the invention preferably has a ratio of inertia to diameter less than 0.5 millinch-ounce-seconds$^2$ per inch.

Because of the greatly reduced inertia of capstans in accordance with the invention such capstans can be used with considerably smaller drive motors than are required for the heavier capstans of the prior art. Thus in the case of the capstans of 1.25 inch diameter referred to above it was found that such capstan could be used with a smaller motor costing less than one-third the cost of the standard motor used with metal capstans of this size. Accordingly the total power dissipation is reduced. For example prior art metal capstans having a radius on the order of 1.25 inches have a total power dissipation on the order of 231 watts when operated at 120 inches per second. On the other hand the plastic capstans of the invention have been determined to involve a power dissipation on the order of 174 watts when operated at 200 inches per second.

Additional advantages of the lightweight plastic capstans in accordance with the invention include reduced capstan motor torque requirements and an increase in the resonant frequency. The torque motor required for one such capstan having a 1.25 inch radius has been determined to be 68.4 inch-ounces. This figure is comprised of 59.4 inch-ounces due to the combined inertia of the capstan and associated drive motor, 6 inch-ounces due to the tension difference in the tape and 3 inch-ounces due to the viscous drag of the motor. It will be appreciated by those skilled in the art that such figures constitute a significant improvement over the prior art, particularly when it is considered that the inertia or acceleration torque of the tape itself which has previously been neglected in most calculations or measurements of this type is now a significant factor. The greatly reduced mass of the capstan as compared with capstans of the prior art provides for an increased resonant frequency of the shaft of the associated motor. This frequency which should desirably be outside the amplifier bandwidth at the frequency of operation of the system is typically made as high as possible. Thus smaller motor shafts can be used with capstans in accordance with the invention, again decreasing the total inertia of the capstan-motor combination.

As previously noted the sizes of any holes or grooves in the outer surface of capstans of the prior art are severely limited by the requirement that the outer rim of such capstans be rigid. Where such outer rim is made of metal the rim, which contributes most significantly to capstan inertia, must typically be made relatively thin so as to reduce the overall inertia of the capstan. By the same token if too many holes or grooves are provided in the outer surface of the rim, the rim flexes under the forces which occur during handling or operation so as to exceed the elastic limit of the metal and thereby damage or destroy the capstan. Typically holes or grooves in the outer surface of such prior art capstans may comprise no more than 20% of the total area of such surface. As a result the communication of reduced or increased pressure sources from within the capstan to the capstan outer surface is thereby limited.

In capstans according to the invention a large portion of the total area of the capstan outer surface may be comprised of holes or grooves so as to greatly enhance vacuum or high pressure communication to the tape despite the relative thinness of the outer rim 16. The primary reason for this is that the rim 16 can flex during handling, shipment or assembly or otherwise undergo substantial distortion due to the elasticity thereof. Accordingly it has been found that in capstans according to the invention approximately 80% or more of the outer surface 22 of the rim 16 may comprise holes or grooves. An example of this is provided by FIG. 7 which shows an alternative configuration of the rim 16 in cross section.

In the particular arrangement of FIG. 7 the outer surface 22 is provided with a plurality of circumferential grooves 50 which have been cut into the surface 22 between lands 52 which comprise but a small portion of the total area of the surface 22 with the grooves 50 comprising a much greater portion. The grooves 50 may be advantageously employed to dispel air between the outer surface 22 and the tape and thereby enhance the engagement of the tape by the capstan 10. Where desired the grooves 50 may also be provided with holes (not shown) which extend downwardly through the thickness of the rim 16 so as to effect communication of low or high pressure sources inside the capstan with the outer surface 22 and the tape.

Prior art capstans frequently are provided with an outer coating so as to enhance the frictional contact between the capstan and the tape. Where the outer rim is made of metal such coating is frequently of material such as neoprene and provides a coefficient of friction on the order of 0.7. In capstans according to the present invention enhanced frictional contact can also be achieved by coating the outer surface 22 of the rim 16 with an appropriate material. In one practical example a 0.005–0.010 inch coating of polyurethane provides a coefficient of friction of at least 0.7.

Figure 9:
FIG. 9 is a block diagram comprising the preferred steps of making the webs of capstans in accordance with the invention.
Figure 8:
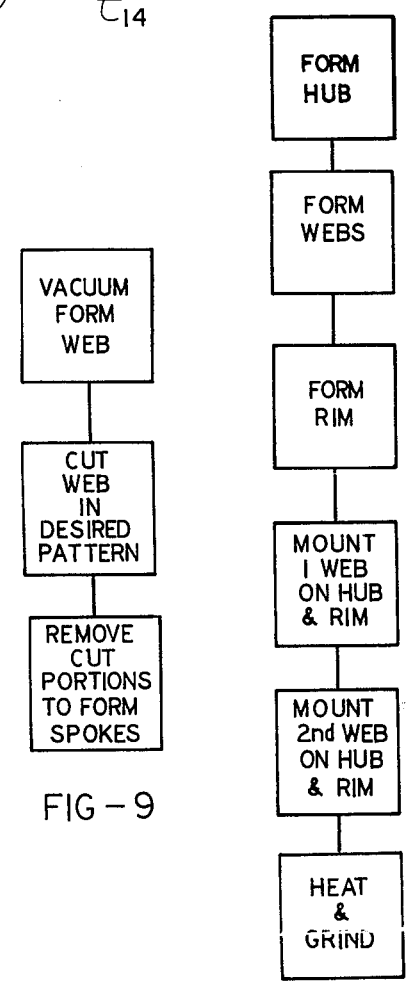
FIG. 8 is a block diagram of the involved steps in one preferred method of making capstans in accordance with the invention.

FIGS. 8 and 9 depict the step involved in preferred methods of constructing capstans in accordance with the invention. In designing a capstan for a particular requirement the initial step is the selection of an appropriate size. The size selected depends on a number of factors including the speed of operation and generally increases with increasing nominal speeds of the tape system. Once the size is determined the designer can then calculate the required strength of the capstan which depends on a number of factors including the tension differential of the magnetic tape. The strength requirements will in part determine the number of spokes required in the webs 14. Any appropriate number of spokes may be selected, with increasing numbers of spokes providing for greater strength and rigidity of the resulting capstan.

With the size and design of the capstan having been determined, the next step is to make the various parts; namely the hub 12, the pair of webs 14 and the rim 16. These parts may be fabricated by any appropriate methods depending upon the materials used as well as other considerations. However certain methods of fabrication are preferred, particularly where materials such as Lexan, nylon and ABS are used.

The hub 12 which is a hollow, generally cylindrically shaped element may be formed by molding of plastic. However closer tolerances can usually be achieved by grinding or lathe turning the hub 12 from a piece of plastic The next step is to form the webs 14. Again the webs may be fabricated using any appropriate technique for forming plastic such as by injection molding. However injection molding is made difficult by the extreme thinness of the webs 14. A more desirable way of fabricating the webs 14 is to use conventional vacuum forming techniques in which the plastic is heated and thereafter drawn over a mold to form the webs as depicted in the first step of FIG. 9. Thereafter the webs are die cut along a predetermined pattern so as to define the inner and outer peripheries thereof as well as the openings 40. The openings 40 are then formed by removing the cut portions corresponding thereto so that only the spokes 42 remain. When the capstan 10 is to be used in conjunction with a pressure differential, formation of the openings 40 may be omitted. The spokes 42 have a width in the circumferential direction of about 150 mils at their narrowest point near the center thereof and are manufactured from 10 mil stock which is thinned somewhat when vacuum formed. The combination of low inertia and good strength in the circumferential direction is thus attained with a width to thickness ratio of at least 15 at the narrowest point.

Next the rim 16 is formed by an appropriate technique. One preferred method of forming the rim 16 is to grind or lathe turn the rim from a piece of plastic. A less desirable way which is nevertheless an easier and less expensive procedure is to form the rim by cutting from flat stock. This involves cutting an elongated piece of plastic from a flat plastic sheet and then looping the cut piece of plastic by joining the opposite ends to form the cylindrical rim.

Figure 10:
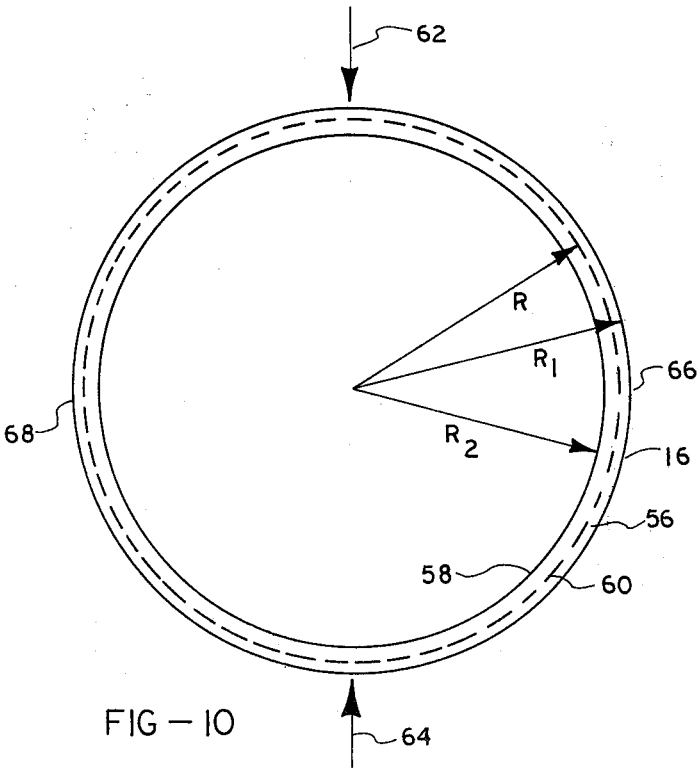
FIG. 10 is a diagram illustrating the relationship of variables pertinent to the invention.

A key factor in the manufacture of a lightweight capstan 10 from extremely thin polycarbonate or other material is the ability of the material to flex without permanent deformation in response to applied stresses, whether from ordinary tape tension during operation or from bumps or other handling stresses. This high degree of elasticity permits the radius of curvature of the rim 16 to be changed from its unstressed condition in accordance with the formula $$\frac{a}{R_s} - \frac{a}{R} \geq 0.015,$$

where, as shown in FIG. 10, R is the mean radius $$\frac{R_1 + R_2}{2}$$

of the material of the outer rim 16 when unstressed. With $R_1$ being the radius to the outermost circumference 56, $R_2$ being the radius to the innermost circumference 58 of rim 16, and R being the radius to the mean circumference 60; "a" is half the difference between the outer and inner radii, $$\frac{R_1 - R_2}{2},$$

and $R_s$ is the main radius after stressing by decreasing the radius of curvature as by applying compressive forces 62, 64 to decrease the radius of curvature at points 66, 68. A conventional metal capstan is considerably less elastic and has an approximate flexture relationship of $$\frac{a}{R_s} - \frac{a}{R} \leq 0.003$$

without sustaining at least a small amount of permanent distortion. As a result, a conventional metal capstan must be made considerably heavier and stronger than capstans in accordance with this invention in order to absorb ordinary bumps and stresses without permanent deformation. Flat stock may be considered to have an unstressed means radius R of infinity.

With the hub, webs and rim formed as discussed, the capstan may be assembled. The first step is to mount one of the webs 14 between the hub 12 and rim 14 and secure it therebetween using an epoxy, polyester or other appropriate solvent cement. Next the other web 14 is mounted on the hub 12 and rim 16, again using epoxy or other appropriate cement. A solution of polycarbonate plastic in methyl chloride has been found to provide excellent bonding characteristics for capstans manufactured from polycarbonate plastic. If a jig is used for assembly it may be desirable to assemble the other web 14 with the spokes rotated one-half spoke space to allow the jig to extend through the capstan. The final step in completing the capstan 10 is to machine or grind the outer surface 22 of the rim 16 while rotating the capstan about its central axis 20. The circumference of the capstan must typically be ground to relatively close tolerances on the order of 0.002 inch or less. The two primary considerations with respect to the grinding operation are that the outer surface 22 of the rim 16 be relatively smooth and that it be relatively concentric or in-round with respect to the central axis 20. The use of epoxy or other cement to join together the various parts may cause stresses in the joints which can show up in the form of distortion in the capstan 10 if it becomes heated during use. To avoid this it is preferred that the capstan be heated to a preselected temperature and maintained at such temperature during the grinding or machining thereof. The distortion which may result from stressing such as from the cemented joints may become particularly pronounced if the spokes 42 of the opposite webs 14 are offset unsymmetrically from one another. This problem can be overcome when the spokes are offset equally from one another such as by 22½° when the spokes are separated by 45°to increase the strength of the capstan 10 or facilitate assembly. Otherwise the spokes 42 of the respective webs 14 may be aligned with one another in opposing relationship.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A low inertia capstan for use in a digital magnetic tape transport comprising:
   a generally cylindrical hub rotatable about a central axis thereof;

a pair of at least partially conical web elements mounted on opposite sides of the hub for rotation therewith, said web elements being circumferentially rigid to maintain a rim rotationally fixed relative to the hub and having thin walls which may be substantially flexed without permanent deformation; and a hollow, generally cylindrical rim mounted on the pair of partially conical web elements.

2. The invention defined in claim 1, wherein the hub, the conical web elements and the rim are made of plastic.

3. The invention defined in claim 1, wherein the conical web elements have a thickness of approximately 0.01 inch or less and are concentrically disposed on the hub so as to be separated by distances in the vicinity of the hub which are greater than the distances which separate the conical web elements in the vicinity of the rim.

4. A low inertia capstan for use in a digital magnetic tape transport comprising:
   a generally cylindrical hub rotatable about a central axis thereof;
   a pair of at least partially conical web elements mounted at opposite sides of the hub for rotation therewith, said web elements having a spacing therebetween in the vicinity of the hub which is greater than a spacing therebetween in the vicinity of a rim and being circumferentially rigid to maintain a rim rotationally fixed relative to the hub and having thin walls which may be substantially flexed without permanent deformation; and
   a hollow, generally cylindrical rim mounted on the pair of partially conical web elements, the rim including a pair of radial flanges on the inside thereof disposed between and adjacent respective ones of the conical web elements.

5. A capstan for use in a digital magnetic tape transport comprising:
   a generally cylindrical hub;
   a hollow, generally cylindrical rim generally concentrically disposed about the hub, the rim having a thin, cylindrical outer circumference and being capable of substantial flexure without permanent deformation; and
   at least one generally circular plastic web disposed between and mounting the rim on the hub to maintain circumferential and axial rigidity between the rim and hub during tape transport operation.

6. The invention defined in claim 5, wherein the plastic web includes a plurality of spokes extending generally radially outwardly between the hub and the rim, each of the spokes having a cross-sectional shape which is curved.

7. The invention defined in claim 6, wherein each of the spokes includes a pair of flanges disposed on opposite sides thereof along a substantial portion of the length thereof between the hub and the rim, the flanges extending in directions generally normal to the web.

8. A low inertia, highly elastic capstan for use in a digital magnetic tape transport, said capstan including an inner hub portion rotatable about an axis, a thin, elastic outer rim portion generally concentrically disposed about the inner hub portion and having a cylindrical outer circumference adapted to engage and drive a magnetic tape, and at least two web elements extending between and mounting the outer rim portion on the inner hub portion, said web elements being circumferentially and radially rigid to maintain the rim rotationally and radially fixed relative to the hub and having thin walls which may be substantially flexed without permanent deformation, a substantial portion of the capstan being made of plastic.

9. The invention defined in claim 8, wherein all of the capstan is made of plastic.

10. The invention defined in claim 8, wherein the plastic portion of the capstan comprises thermoplastic polycarbonate resins.

11. The invention defined in claim 8, wherein the plastic portion of the capstan comprises a thermoplastic nylon resin.

12. A low inertia, highly elastic capstan for use in a digital magnetic tape transport, said capstan including an inner hub rotatable about an axis, a flexible outer rim generally concentrically disposed about the inner hub and adapted to engage and drive a magnetic tape, and two at least partially conical, thin webs mounted on opposite sides of the hub which may be flexed without permanent deformation extending between and mounting the outer rim portion on the inner hub portion, the rim and webs being comprised of material having a strain at yield greater than 0.015.

13. The invention defined in claim 12, wherein the material comprising at least the outer rim and the webs has a strain at yield greater than 0.003, and has a tensile modulus of elasticity less than $30 \times 10^5$ pounds per square inch, and wherein the capstan has a ratio of inertia to diameter less than 0.5 millinch-ounce-second$^2$ per inch.

14. A low inertia, highly elastic capstan for use in a digital magnetic tape transport, said capstan including an inner hub portion rotatable about an axis, an outer rim portion generally concentrically disposed about the inner hub portion and adapted to engage and drive a magnetic tape, and a web portion including two at least partially conical web elements mounted on opposite sides of the hub and extending between and mounting the outer rim portion on the inner hub portion, the capstan having a diameter of at least approximately 1½ inches and an inertia at least as low as 0.4 millinch-ounce-seconds$^2$.

15. The invention defined in claim 14, wherein the capstan diameter is at least approximately 2½ inches and the capstan inertia is no greater than 0.3 millinch-ounce-seconds$^2$.

16. A resiliently deformable capstan for driving magnetic tape in a digital tape transport comprising:
   in inner hub;
   an elastic outer rim disposed concentrically about the inner hub; and
   means connecting the outer rim to the inner hub in a manner inhibiting substantially all relative motion therebetween in a circumferential direction of rotation while permitting substantial axial motion of the outer rim relative to the hub without permanent deformation of the capstan, said means including a pair of at least partially conical web elements mounted at opposite sides of the hub.

17. The capstan as set forth in claim 16 above, wherein the rim is deformable by stress into a smaller radius than the unstressed radius thereof in accordance with the relationship $$\frac{a}{R_s} - \frac{a}{R} > 0.003$$

where a is half the thickness of the rim, $R_s$ is the mean radius of the material of the rim under stress and R is the mean unstressed radius of the material of the rim.

18. The capstan as set forth in claim 17 above, wherein the relationship is $$\frac{A}{R_s} - \frac{a}{R} > 0.015.$$

19. The capstan as set forth in claim 16 above, wherein the connecting means includes a pair of web members having a thickness less than or equal to 0.010 inch.

20. The capstan as set forth in claim 16 above, wherein the connecting means includes a pair of thin web members having radially extending spokes with a minimum width in the circumferential direction at least 15 times the thickness of the material of the spokes.

21. A capstan for driving magnetic tape comprising:
a generally cylindrical inner hub;
a resiliently deformable outer rim disposed concentrically about the inner hub; and
a pair of thin, at least partially conical web members mounted in spaced apart relationship concentric with the inner hub and connected to maintain the hub and rim in a predetermined relationship, said web members having substantial rigidity with respect to relative motion between the rim and hub in a circumferential direction of rotation and being resiliently deformable in response to relative motion between the rim and hub in other directions.

22. The capstan as set forth in claim 21 above, wherein the web members are generally conical in shape and are mounted in facing relationship with the greater spacing adjacent the hub and the least spacing adjacent the rim.

* * * * *